(12) United States Patent
Radun (10) Patent No.: US 10,461,542 B2
(45) Date of Patent: Oct. 29, 2019

(54) POWER DISTRIBUTION NETWORK

(71) Applicant: GE AVIATION SYSTEMS LLC, Grand Rapids, MI (US)

(72) Inventor: Arthur Vorwerk Radun, Mason, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 185 days.

(21) Appl. No.: 15/645,564

(22) Filed: Jul. 10, 2017

(65) Prior Publication Data

US 2019/0013679 A1   Jan. 10, 2019

(51) Int. Cl.

| H02J 3/14 | (2006.01) |
|---|---|
| H02J 4/00 | (2006.01) |
| H02J 3/36 | (2006.01) |
| H02J 3/00 | (2006.01) |
| H02J 1/08 | (2006.01) |
| H02J 1/14 | (2006.01) |
| B64D 47/00 | (2006.01) |

(52) U.S. Cl.
CPC ........... H02J 4/00 (2013.01); H02J 1/08 (2013.01); H02J 1/14 (2013.01); H02J 3/005 (2013.01); H02J 3/14 (2013.01); H02J 3/36 (2013.01); *B64D 47/00* (2013.01); *B64D 2221/00* (2013.01)

(58) Field of Classification Search
CPC ........ H02J 4/00; H02J 1/08; H02J 1/14; H02J 3/005; H02J 3/14; H02J 3/36; B64D 47/00; B64D 2221/00
USPC .......................................................... 307/24
See application file for complete search history.

(56) References Cited

U.S. PATENT DOCUMENTS

| 5,557,189 A * | 9/1996 | Suzuki ............... H01M 10/44 320/119 |
|---|---|---|
| 5,773,959 A * | 6/1998 | Merritt ............. H01M 10/441 320/117 |
| 6,058,032 A * | 5/2000 | Yamanaka ........... H02J 7/0013 363/71 |
| 7,550,866 B2 | 6/2009 | Breit et al. |
| 8,098,048 B2 * | 1/2012 | Hoff ..................... H02J 7/0019 320/116 |
| 8,618,692 B2 | 12/2013 | Adest et al. |
| 9,142,964 B2 | 9/2015 | Harrison |
| 9,143,029 B2 | 9/2015 | Sihler et al. |
| 9,263,895 B2 | 2/2016 | Naiknaware et al. |
| 2015/0303527 A1 | 10/2015 | Maxwell |

* cited by examiner

*Primary Examiner* — Dinh T Le
(74) *Attorney, Agent, or Firm* — McGarry Bair PC (57) ABSTRACT

A power system and method of operating the power system includes a first power source and a second power source arranged in a series, a first electrical load and a second electrical load arranged in series with first and second power sources, and a set of bypass current paths independently associated with at least a subset of the first power source, the second power source, the first electrical load, and the second electrical load.

20 Claims, 8 Drawing Sheets

POWER DISTRIBUTION NETWORK

BACKGROUND OF THE INVENTION

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, power distribution nodes dispersed throughout the power system ensure the power delivered to the electrical loads meets the designed power criteria for the loads.

BRIEF DESCRIPTION OF THE INVENTION

In one aspect, the present disclosure relates to a power system including a first power source and a second power source arranged in a series, a first electrical load and a second electrical load arranged in series with first and second power sources, and a set of bypass current paths independently associated with at least a subset of the first power source, the second power source, the first electrical load, and the second electrical load, and wherein the set of bypass current paths are selectably enabled to allow current to bypass a pair of components comprising at least one of the first power source and the second power source, and at least one of the first electrical load and the second electrical load.

In another aspect, the present disclosure relates to a method of operating a power system, including detecting an electrical condition in a power system component, the power system components including a set of power sources and a set of electrical loads in series, enabling, by a controller module, a first bypass current path in parallel with the power system component and disabling the power system component from the series, and simultaneously enabling, by the controller module, a second bypass current path in parallel with another power system component and disabling the another power system component from the series. The power system component and the another power system component are a pair of components comprising one power source and one electrical load.

In yet another aspect, the present disclosure relates to a power system including a set of direct current power sources arranged in a series, a set of electrical loads arranged in series with set of power sources, a set of bypass current paths independently associated with the set of the power sources and the electrical loads, and a controller module configured to selectably enable at least a subset of bypass current paths to allow current to bypass a pair of components comprising at least one of the set of power sources and at least one of the set of electrical loads.

DESCRIPTION OF EMBODIMENTS OF THE INVENTION

The described aspects of the present disclosure are directed to a method and apparatus associated with a power distribution network or system. One example environment where such a method and apparatus can be used includes, but is not limited to, a power distribution system for an aircraft. While this description is primarily directed toward a power distribution system for an aircraft, it is also applicable to any commercial or residential environment using a power distribution system where input power is received, acted upon (if necessary), and distributed to one or more electrical loads. In another non-limiting example, aspects of the disclosure can be utilized for under water power distribution.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

While terms such as "voltage", "current", and "power" can be used herein, it will be evident to one skilled in the art that these terms can be interchangeable when describing aspects of the electrical circuit, or circuit operations. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The aspects of the disclosure can be implemented in any electrical circuit environment having a switch. A non-limiting example of an electrical circuit environment that can include aspects of the disclosure is an aircraft power system architecture, which enables production of electrical power from at least one spool of a turbine engine, preferably a gas turbine engine, and delivers the electrical power to a set of electrical loads via at least one solid state switch, such as a solid state power controller (SSPC) switching device. One non-limiting example of the SSPC can include a silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can be included.

The exemplary drawings are for purposes of illustration only and the dimensions, positions, order and relative sizes reflected in the drawings attached hereto can vary.

Figure 1:
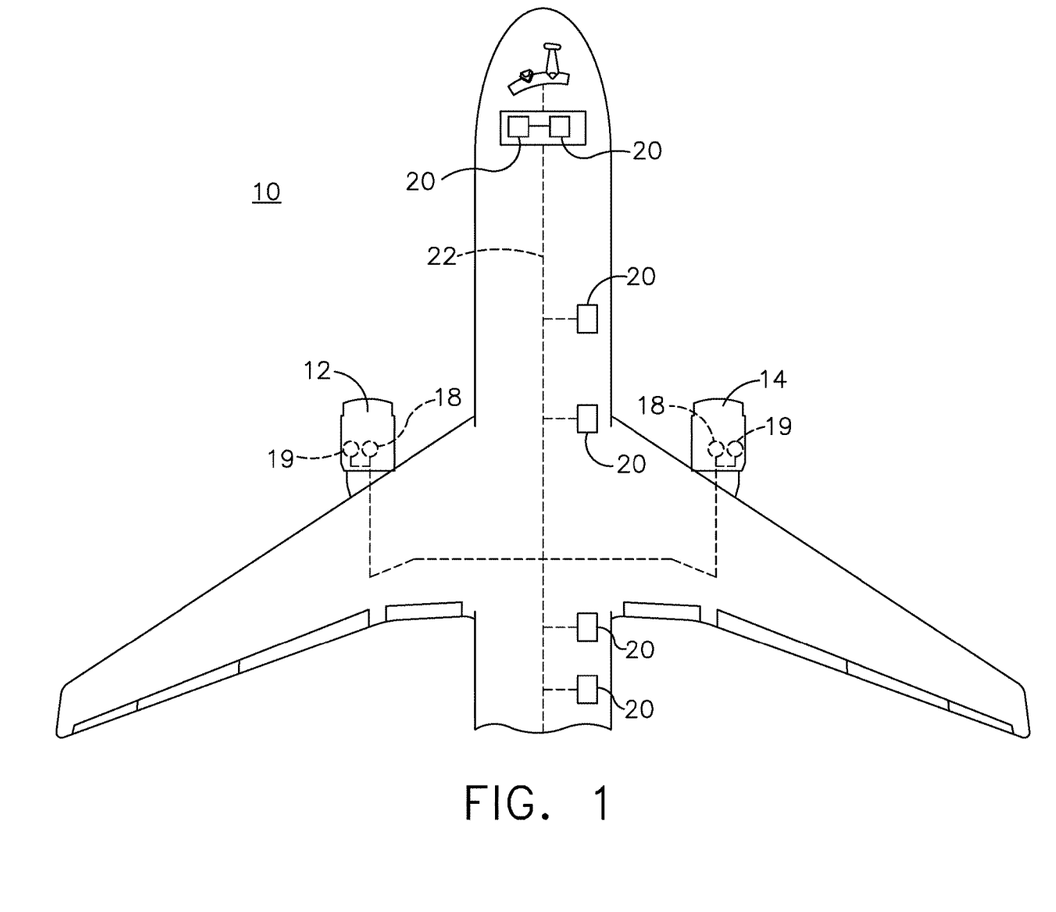
FIG. 1 is a top down schematic view of the aircraft and power distribution system of an aircraft in accordance with various aspects described herein.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially alike or identical, and can further include at least one power source, such as an electric machine or a generator, illustrated as a first generator 18 and a second generator 19 in each respective engine system 12, 14. While two generators 18, 19 are schematically illustrated, aspects of the disclosure can be included wherein a set of generators are utilized for power generation, for example, at a single engine system 12, 14.

The aircraft is shown further having a set of power-consuming components, or electrical loads 20, such as for instance, an actuator load, flight critical loads, and non-flight critical loads. The electrical loads 20 are electrically coupled with at least one of the generators 18, 19 via a power distribution system including, for instance, power transmission lines 22, conductors, bus bars, power distribution nodes, or the like. It will be understood that the illustrated aspects of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a turbine engine spool, to provide a driving force for the set of generators 18, 19. The set of generators 18, 19, in turn, generate power, such as direct current (DC) power, and provides the generated power to the transmission lines 22. In non-limiting aspects of the disclosure, the transmission lines 22, or power distribution nodes connected therewith, can, for example, provide switching, power conversion, or distribution management functions, as needed, in order to provide the desired electrical power to the electrical loads 20 for load operations.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. Furthermore, additional power sources for providing power to the electrical loads 20, such as emergency power sources, ram air turbine systems, starter/generators, or batteries, can be included, and can substitute for the power source. It will be understood that while one aspect of the disclosure is shown in an aircraft environment, the disclosure is not so limited and has general application to electrical power systems in non-aircraft applications, such as other mobile applications and non-mobile industrial, commercial, and residential applications.

Figure 2:
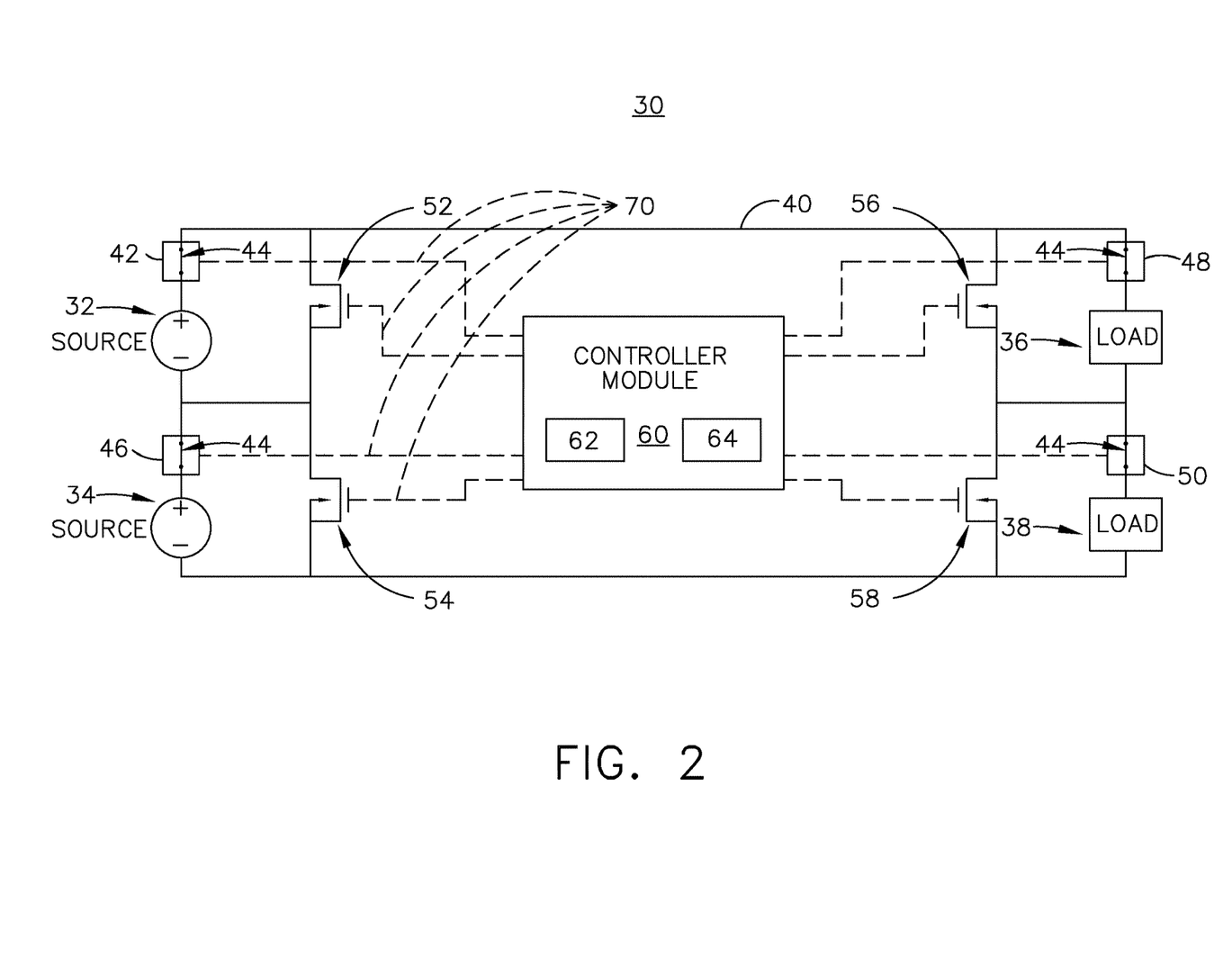
FIG. 2 is a schematic view of a power distribution system in accordance with various aspects described herein.

FIG. 2 illustrates a non-limiting schematic example of a power distribution system 30. As shown, the power distribution system 30 can include a set of power generator systems illustrated as a first power source 32 and a second power source 34. The first and second power sources 32, 34 can be configured, adapted, or the like, to provide corresponding respective DC power outputs. As shown, the first and second power sources 32, 34 can be arranged in a series connection. The power distribution system 30 can also include a corresponding first electrical load 36 and second electrical load 38, also arranged in series with one another, and the first and second power sources 32, 34. The set of power sources 32, 34 and the set of electrical loads 36, 38 can be connected by way of a set of transmission lines or conductors 40.

Non-limiting examples of the first or second power sources 32, 34 can include, but are not limited to, the aforementioned set of generators 18, 19, or another power source such as a set of batteries, photovoltaic sources, wind sources, auxiliary generators, or the like. Additionally, while only a single schematic electrical load 36, 38 is illustrated, the electrical loads 36, 38 can represent a set of electrical loads powered by the power distribution system 30. In non-limiting aspects of the disclosure, the first electrical load 36 can represent a set of electrical loads that consume a substantial portion or all of the power supplied by the first power source 32 or the second power source 34. Likewise, in another non-limiting aspect of the disclosure, the second electrical load 38 can represent a set of electrical loads that consume a substantial portion or all of the power supplied by the other of the first power source 32 or the second power source 34. In this sense, the first electrical load 36 or the second electrical load 38 can be "associated" with a specific first power source 32 or second power source 34, as a pair.

In yet another non-limiting aspect of the disclosure, the first and second power sources 32, 34 can be substantially alike, identical from an electrical perspective, such as 270 Volt direct current (DC) generators. In the instance that the first and second power sources 32, 34 are substantially alike, the first electrical load 36 or the second electrical load 38 can be "associated" with either of the first power source 32 or second power source 34, as a pair. In another non-limiting aspect of the disclosure, the first and second electrical loads 36, 38 can be predetermined, preselected, or electrically arranged such that the electrical loads 36, 38 are identical from an electrical perspective, or power demands.

The power distribution system 30 can further include a first set of switches 42, 46, 48, 50, each having a controllable switching element 44. Each of the first set of switch 42, 46, 48, 50 can be associated with a corresponding power source 32, 34 or electrical load 36, 38, as shown. For example, a first switch 42 is in series with and associated with the first power source 32, a second switch 46 is in series with and associated with the second power source 34, a third switch 48 is in series with and associated with the first electrical load 36, and a fourth switch 50 is in series with and associated with the second electrical load 38.

The power distribution system 30 is shown further having a set of bypass current paths independently associated with at least a subset of the set of power sources 32, 34 and with at least a subset of the set of electrical loads 36, 38. As used herein, "independently associated" means that the respective bypass current paths can operate independently of other bypass current paths or non-bypassed current paths. The set of bypass current paths can each include a respective switch of a second set of switches 52, 54, 56, 58, in-line with the bypass current path, that enable or disables a current path in parallel with the respective power source 32, 34, electrical load 36, 38, and associated first set of switches 42, 46, 48, 50. For example, a fifth switch 52 can be arranged electrically in parallel with the first power source 32 and the first switch 42, such that when the fifth switch 52 is closed and the first switch 42 is opened, the first power source 32 is "bypassed" and disconnected from the power distribution system 30. In another example, a sixth switch 54 can be arranged electrically in parallel with the second power source 34 and the second switch 46, such that when the sixth switch 54 is closed and the second switch 46 is opened, the second power source 34 is bypassed and disconnected from the power distribution system 30. In yet another example, a seventh switch 56 can be arranged electrically in parallel with the first electrical load 36 and the third switch 48, such that when the seventh switch 56 is closed and the third switch 48 is opened, the first electrical load 36 is bypassed and disconnected from the power distribution system 30. In yet another example, an eighth switch 58 can be arranged electrically in parallel with the second electrical load 38 and the fourth switch 50, such that when the eighth switch 58 is closed and the fourth switch 50 is opened, the second electrical load 38 is bypassed and disconnected from the power distribution system 30.

While the first set of switches 42, 46, 48, 50 are illustrated as mechanical-type switches having a controllable switching element 44, and the second set of switches 52, 54, 56, 58 are illustrated as transistor-type switches, non-limiting aspects of the disclosure are envisioned wherein each switch, or a subset thereof can include mechanical-type switches, transistor-type switches, or a combination thereof. All permutations for the first and second sets of switches 42, 46, 48, 50, 52, 54, 56, 58 can be included.

The power distribution system 30 can further include a controller module 60 having a processor 62 and memory 64. The controller module 60 can be communicatively connected with the first set of switches 42, 46, 48, 50 and the second set of switches 52, 54, 56, 58 by communicative connections 70. In this sense, the controller module 60 or processor 62 be configured to operably open or close at least a subset of the switches 42, 46, 48, 50, 52, 54, 56, 58 in accordance with a suitable program or executable instruction set.

In one non-limiting aspect of the disclosure, the controller module 60 or processor 62 can be configured to simultaneously operate, that is, enable or disable conductive connections, in a pair of at least two switches 42, 46, 48, 50, 52, 54, 56, 58. For instance, in a non-limiting aspect of the disclosure, a pair of switches can include at least two switches associated with a respective power source 32, 34 or electrical load 36, 38. Thus, a first pair of switches can include the first and fifth switches 42, 52, a second pair of switches can include the second and sixth switches 46, 54, a third pair of switches can include the third and seventh switches 48, 56, and a fourth pair of switches can include the fourth and eighth switches 50, 58. By operably controlling the pair of switches associated with the respective power source 32, 34 or electrical load 36, 38, the controller module 60 or processor 62 can effect, control, operate, or otherwise disconnect the power source 32, 34 or electrical load 36, 38 from the power distribution system 30 (via opening the at least one of the first set of switches 42, 46, 48, 50) while simultaneously enabling the associated bypass current path (via closing the at least one of the second set of switches 52, 54, 56, 58), bypassing the now-open series connection of the power source 32, 34 or electrical load 36, 38, In another non-limiting aspect of the disclosure, the controller module 60 or processor 62 can be configured to simultaneously operate at least two pairs of switches, wherein at least a first pair of switches are selected from the subset of switch pairs associated with a power source 32, 35, and wherein at least a second pair of switches are selected from the subset of switch pairs associated with an electrical load 36, 38. In this sense, the controller module 60 or processor 62 can effect, control, operate, or otherwise bypass at least one power source 32, 34 and at least one electrical load 36, 38 from the power distribution system 30 simultaneously. Aspects of the disclosure can be included wherein like numbers of power sources 32, 34 and electrical loads 36, 38 are bypassed simultaneously (e.g. one source and one electrical load, or two sources and two electrical loads).

Figure 3:
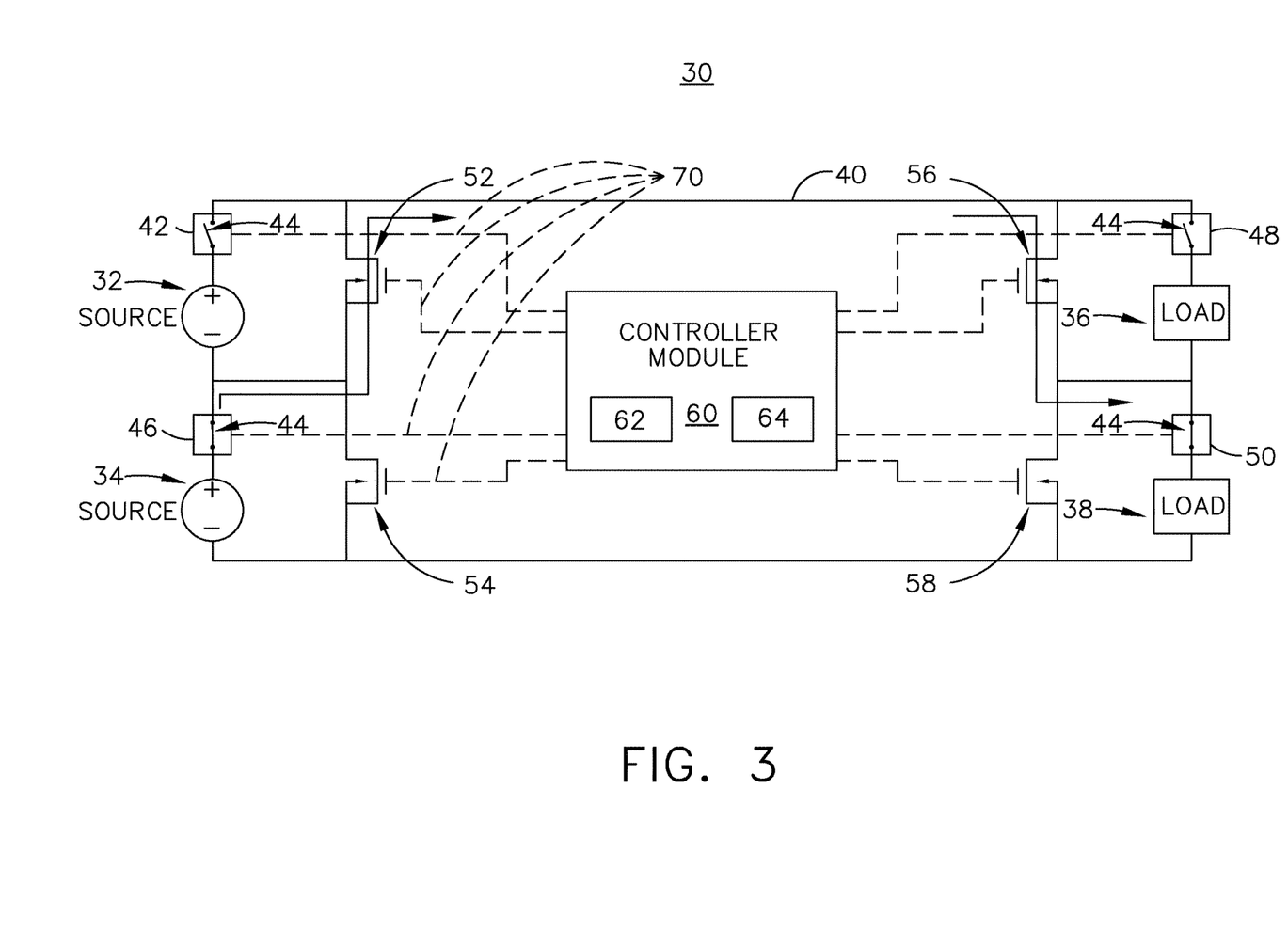
FIG. 3 is a schematic view of a power distribution system of FIG. 2 wherein a bypass current path is enabled, in accordance with various aspects described herein.

FIG. 3 illustrates a non-limiting example of the power distribution system 30 wherein the first power source 32 and the first electrical load 36 have been bypassed, as described herein. As shown, the first switch 42 has been controllably opened to disconnect the first power source 32 from the conductor 40, while the fifth switch 52 has been controllably closed to bypass the first power source 32 and close the current loop of the power distribution system 30. An arrow represents the bypass current path, bypassing the first power source 32. Likewise, the third switch 48 has been controllably opened to disconnect the first electrical load 36 from the conductor 40, while the seventh switch 56 has been controllably closed to bypass the first electrical load 36 and close the current loop of the power distribution system 30. An arrow represents the bypass current path, bypassing the first electrical load 36. As shown, the second power source 34 and the second electrical load 38 are controllably connected with the power distribution systems by way of the respectively closed second switch 46 and fourth switch 44, and the sixth switch 54 and eighth switch 58 are controllably opened, disabling those respective bypass current paths.

During operation, the controller module 60 or processor 62 is configured to selectably enable or disable, or connect or disconnect the respective set of power sources 32, 34, set of electrical loads 36, 38, or bypass current paths associated therewith, based on, for example, operational characteristics or electrical conditions of the power distribution system 30. For instance, in one non-limiting aspect of the disclosure, certain temporal or temporary electrical loads 36, 38, such as de-icing systems, may not be utilized during warmer weather or continuously during certain flight phases. In another non-limiting aspect of the disclosure, the detection of an electrical fault or failure in a power source 32, 34 or electrical load 36, 38, including but not limited to short circuits, arc faults, or the like, can affect the determination to bypass a specific component 32, 34, 36, 38. In yet another non-limiting aspects of the disclosure can be included wherein the controller module 60 or processor 62 can bypass power sources or electrical loads based on prioritization, load balancing, or sharing considerations.

In yet another non-limiting aspect of the disclosure, at least a subset of the second set of switches 56, 58 can be operated by the controller module 60 or processor 62 to control or ensure the voltage received at the respective electrical load 36, 38 is with a desired tolerance, for example, with the constraint that the current in all of the loads are equal. For example, active loads, including by not limited to DC to DC converters or motor drives can have temporally-varying power demands. In this example, the controller module 60 or processor 62 can operate in a master-slave control scheme, wherein the controller module 60 sends power commands to each electrical load 36, 38 based on the total load power required or desired, and the voltage across the input to each electrical load 36, 38. The controller module 60 can thus "command" or enable more power into a given electrical load 36, 38 compared to a nominal desired power if its input voltage is above the nominal desired value, and "command" or enable less than nominal power into another electrical load 36, 38 if its input voltage is lower than the nominal value. In another non-limiting example, the controller module 60 or processor 62 can operate in a droop control scheme, wherein a commanded delta power into the electrical load 36, 38, relative to its nominal desired power, is made proportional to the delta input voltage from its nominal desired voltage.

In either master slave or droop control, the maximum delta in the power to achieve sharing is limited to a maximum desired value above and below the nominal desired power value. If an electrical fault occurs, the non-faulted (and non-bypassed) electrical loads 36, 38 will command the maximum power delta trying to limit their voltage and the faulted load will command its minimum power to limit fault current. Correspondingly, the power output, and thus voltage, at a corresponding at least one power source 32, 34 will be reduced to zero over a period of time to limit the maximum voltage across the non-faulted loads, while the desired power values at the electrical loads 36, 38 will approach normal current levels for the non-faulted electrical loads 36, 38 and zero voltage across the faulted electrical load 36, 38 and corresponding at least one power source 32, 34. Once the voltage across the faulted load and corresponding at least one power source 32, 34 go to zero current, respectively, the controller module 60 or processor 62 can complete the bypassing of the respective power source 32, 34 and electrical load 36, 38 by operating the respective subset of the first switches 42, 46, 48, 50.

Regardless of the operational characteristic or electrical condition detected, estimated, calculated, or otherwise determined, the controller module 60 or processor 62 can operate the set of switches 42, 46, 48, 50, 52, 54, 56, 58, as described herein, to enable a current bypass pathway, where needed, to allow or enable the power distribution system 30 to operate without the unneeded, unnecessary, or problematic component.

Additional aspects of the disclosure can be included. For example, in one non-limiting aspect, the second set of switches 52, 54, 56, 58 can be capable of repeated switching operations to open and close the bypass current path during bypass operations at a predetermined rated load current, to limit current in the power distribution system, when needed. For example, if one electrical load 36, 38 faults, the non-faulted electrical load 36, 38 in series can at least partially limit a fault current, and at least one of the second set of switches 52, 54, 56, 58 can further lower the fault current, or manage the resulting system 30 current, by way of switching operations. In another non-limiting aspect of the disclosure, by bypassing like numbers of power sources 32, 34 and electrical loads 36, 38, a high voltage (e.g. greater than 540 Volts DC) can be provided, and selectively supplied by way of the power distribution system 30, while maintaining the power system current levels.

In another non-limiting aspect of the disclosure, the second set of switches 52, 54, 56, 58 can alternatively or additionally include a metal-oxide-semiconductor field-effect transistor (MOSFET), an insulated-gate bipolar transistor (IGBT) with a reverse diode, or the like. If power is only communicated in a single direction (e.g. only flows from the power source 32, 34 to the electrical load 36, 38), the second set of switches 52, 54, 56, 58 can include a diode.

Figure 4:
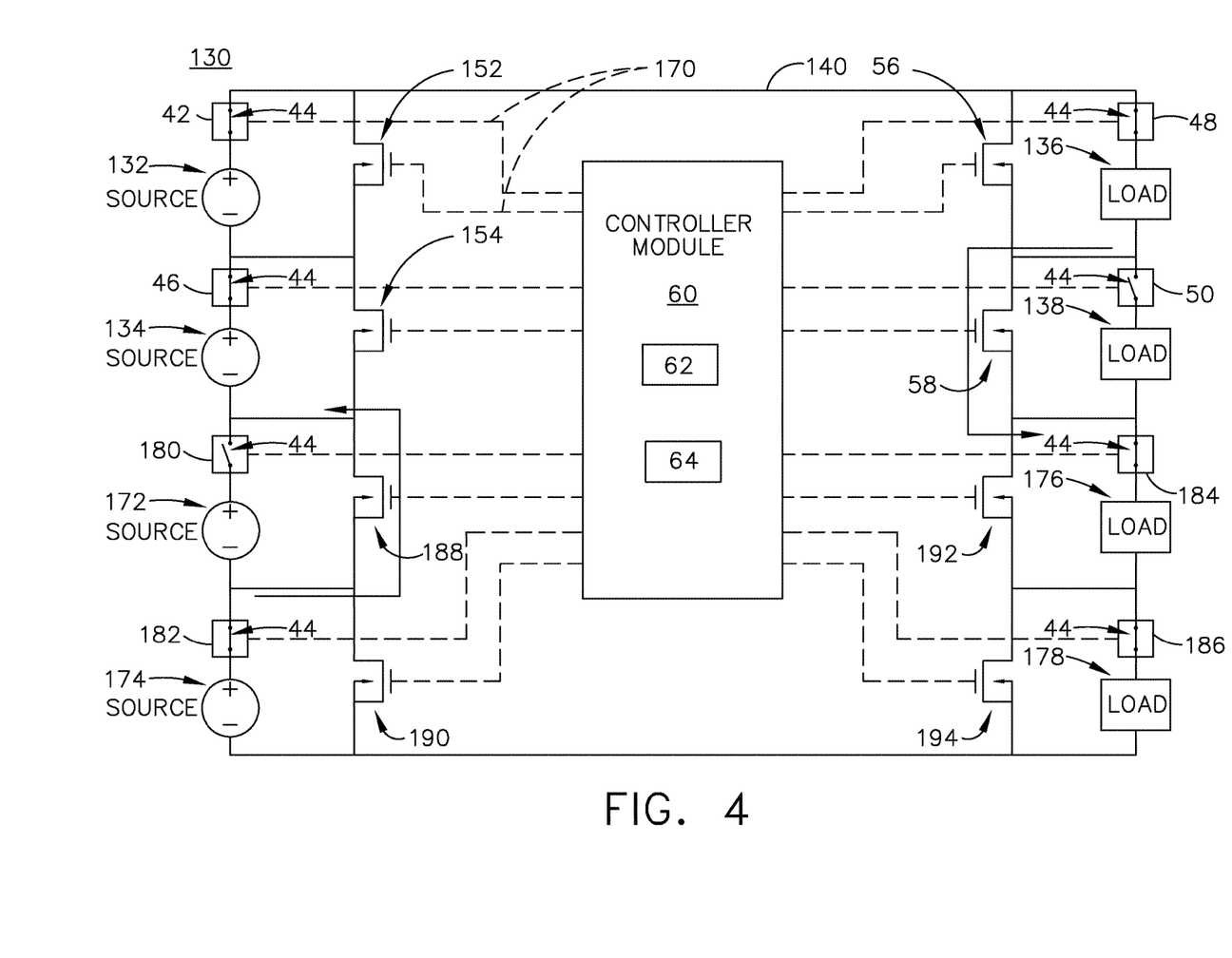
FIG. 4 is a schematic view of another power distribution system, in accordance with various aspects described herein.

While FIGS. 2 and 3 illustrate example power distribution systems 30 having two power sources 32, 34 and two electrical loads 36, 38, aspects of the disclosure can include power distribution systems 30 with any equal number of power sources and electrical loads. FIG. 4 illustrates another power distribution system 130 according to another aspect of the present disclosure. The power distribution system 130 is similar to the power distribution system 30; therefore, like parts will be identified with like numerals increased by 100, with it being understood that the description of the like parts of the power distribution system 30 applies to the power distribution system 130, unless otherwise noted.

As shown, the power distribution system 130 can include four power sources 132, 134, 172, 174, each power source 132, 134, 172, 174 having a switch from the first set of switches 42, 46, 180, 182, and an independently associated bypass current path having a switch from the second set of switches 152, 154, 188, 190. Likewise, the power distribution system 130 can include four electrical loads 136, 138, 176, 178, each electrical load 136, 138, 176, 178 having a switch from the first set of switches 48, 50, 184, 186, and an independently associated bypass current path having a switch from the second set of switches 56, 58, 192, 194. Each switch 42, 46, 48, 50, 56, 58, 152, 154, 180, 182, 184, 186, 188, 190, 192, 194 is controllable by the controller module 60 or processor 62, via the respective set of communicative connections 170.

The switches associated with a particular power source 132, 134, 172, 174 or electrical load 136, 138, 176, 178 can be operated in pairs (for example, switches 180 and 188, or switches 184 and 192) to connect or bypass the respective component 132, 134, 136, 138, 172, 174, 176, 178 with the power distribution system 130. Likewise, at least one power source 132, 134, 172, 174 and at least one electrical load 136, 138, 176, 178 can be operably bypassed in equal numbered pairs (for example, one power source and one electrical load, or three power sources and three electrical loads). As shown, a third power source 172 is bypassed by operating the switches 180, 188 as a pair (bypass current path illustrated as an arrow), as is the second electrical load 138 by operating the switches 50 and 58 as a pair (bypass current path illustrated as an arrow). Also as illustrated, corresponding "numbered" power sources and electrical loads are not required to be bypassed simultaneously. For example, as shown, the "third" power source 172 is bypassed, while the "second" electrical load 138 is bypassed. Thus, the bypassed power source and electrical loads do not need to have the same "location," series string, series location, or series naming. Any permutation of "numbered" power source and "numbered" electrical load is envisioned.

Figure 5:
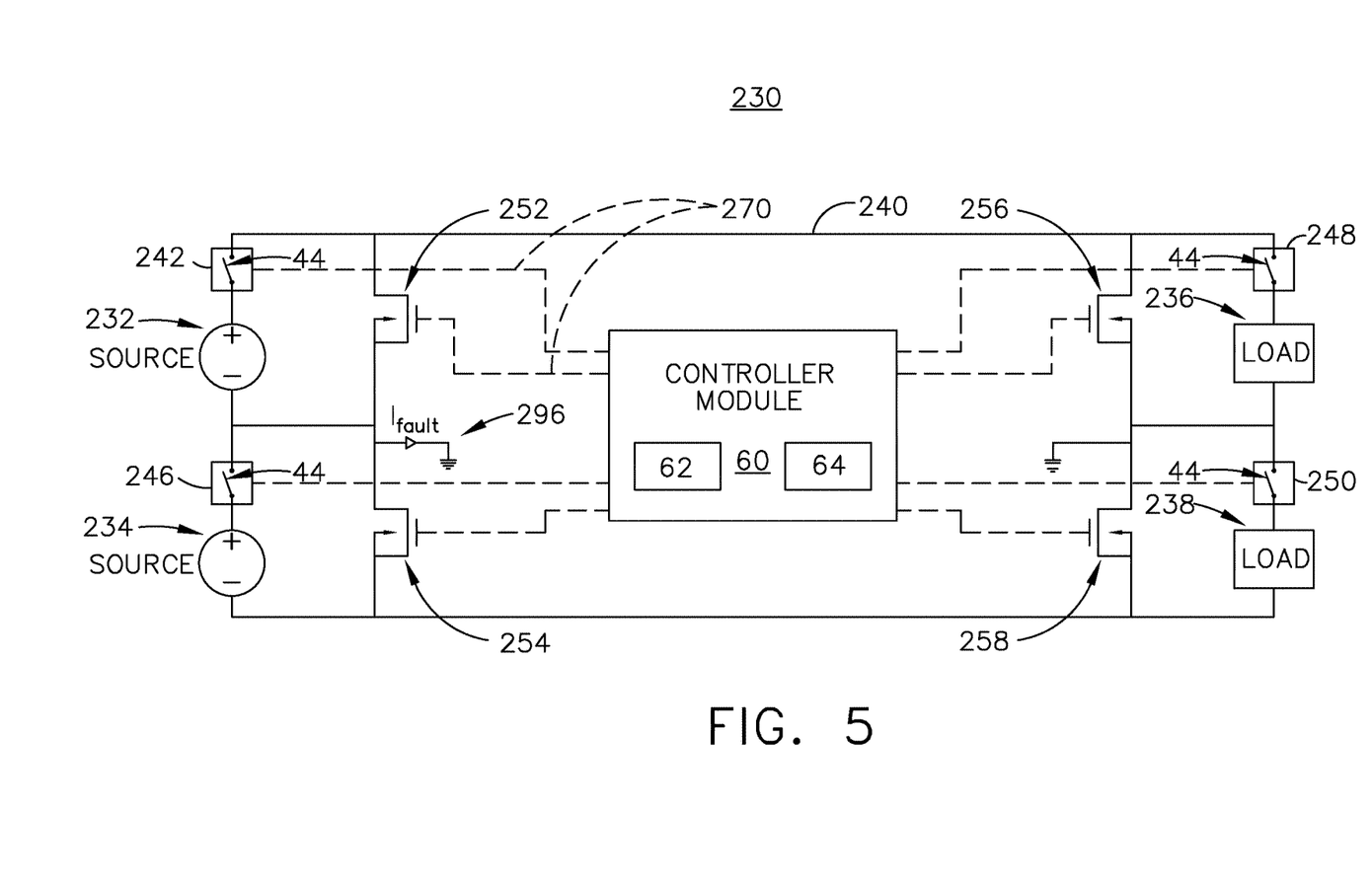
FIG. 5 is a schematic view of another power distribution system with electrical grounding, in accordance with various aspects described herein.

FIG. 5 illustrates another power distribution system 230 according to another aspect of the present disclosure. The power distribution system 230 is similar to the power distribution systems 30, 130; therefore, like parts will be identified with like numerals increased by 200, with it being understood that the description of the like parts of the power distribution systems 30, 130 applies to the power distribution system 230, unless otherwise noted.

As shown, the power distribution system 230 can include an electrical ground 296 connected between the power sources 232, 234, the electrical loads 236, 238, or a combination thereof. In the illustrated configuration, an electrical fault can flow current in the ground path 296, eliminating the interaction between the series power sources 232, 234 and electrical load 236, 238 pairs during the fault. In this example, the electrical fault can be protected in a conventional manner.

Figure 6:
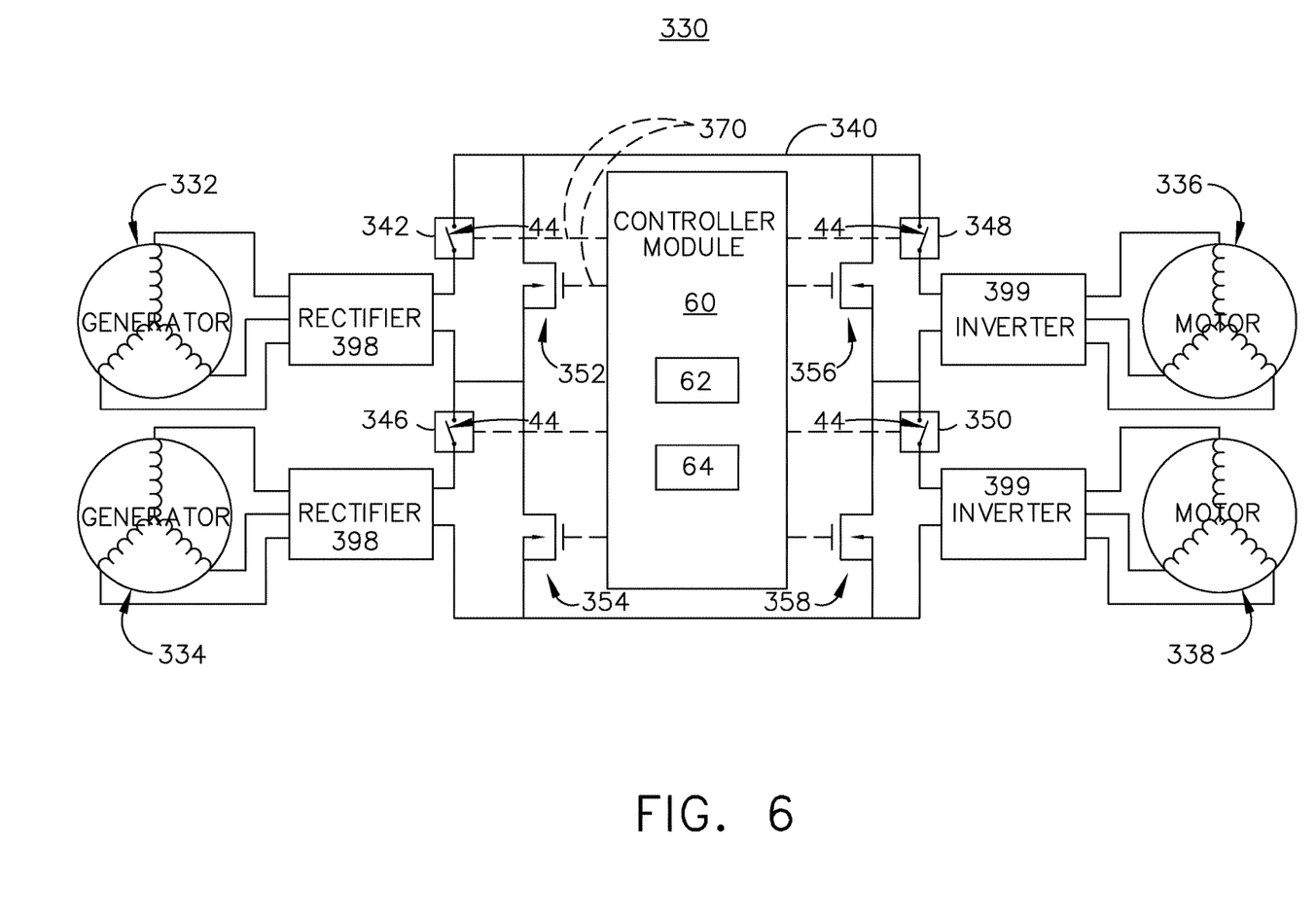
FIG. 6 is a schematic view of another power distribution system with alternating current generators, in accordance with various aspects described herein.

FIG. 6 illustrates another power distribution system 330 according to another aspect of the present disclosure. The power distribution system 330 is similar to the power distribution systems 30, 130, 230; therefore, like parts will be identified with like numerals increased by 300, with it being understood that the description of the like parts of the power distribution systems 30, 130, 230 applies to the power distribution system 330, unless otherwise noted.

FIG. 6 illustrates an example power distribution system 330 having a first AC generator as the first power source 332 and a second AC generator as the second power source 334. Each respective power source 332, 334 is connected with a rectifier 398 to rectify the AC power output to a DC power output provided to the power distribution system 330. Additionally or alternatively, the example power distribution system 330 can include a first motor as the first electrical load 336 and a second motor as the second electrical load 338. Each respective electrical load 336, 338 is connected with an inverter 399 to invert the DC power received by the power distribution system 330 to, for example, a starting power for starting the respective motor.

Figure 7:
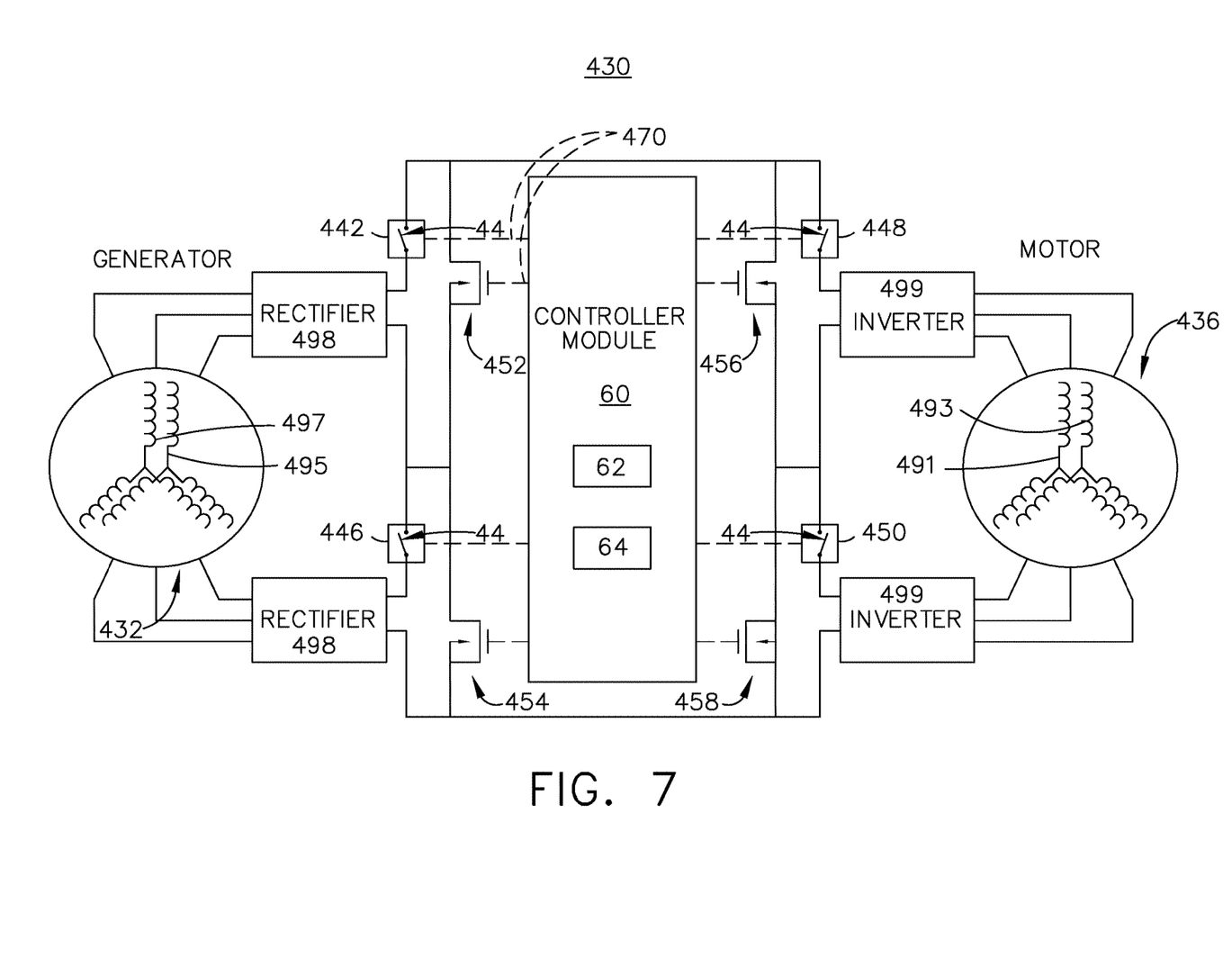
FIG. 7 is a schematic view of another power distribution system with an alternating current generator having dual windings, in accordance with various aspects described herein.

FIG. 7 illustrates another power distribution system 430 according to another aspect of the present disclosure. The power distribution system 430 is similar to the power distribution systems 30, 130, 230, 330; therefore, like parts will be identified with like numerals increased by 400, with it being understood that the description of the like parts of the power distribution systems 30, 130, 230, 330 applies to the power distribution system 430, unless otherwise noted.

FIG. 7 illustrates an example power distribution system 430 having an AC generator as a first power source 432 having multiple sets of generator windings, with a first set of windings 495 and a second set of windings 497. Each respective power set of windings 495, 497 is connected with a rectifier 498 to rectify the AC power output to a DC power output provided to the power distribution system 430. In this example, at least one of the set of windings 495, 497 can be bypassed, as described herein, without bypassing the entire power source 432.

Additionally or alternatively, the example power distribution system 430 can include a motor as a first electrical load 436 having multiple starting windings, shown as a first set of starting windings 491 and a second set of starting windings 493. Each respective set of starting windings 491, 493 is connected with an inverter 499 to invert the DC power received by the power distribution system 430 to, for example, a starting power for starting the respective motor. In this example, at least one of the set of starter windings 491, 493 can be bypassed, as described herein, without bypassing the entire electrical load 436.

Figure 8:
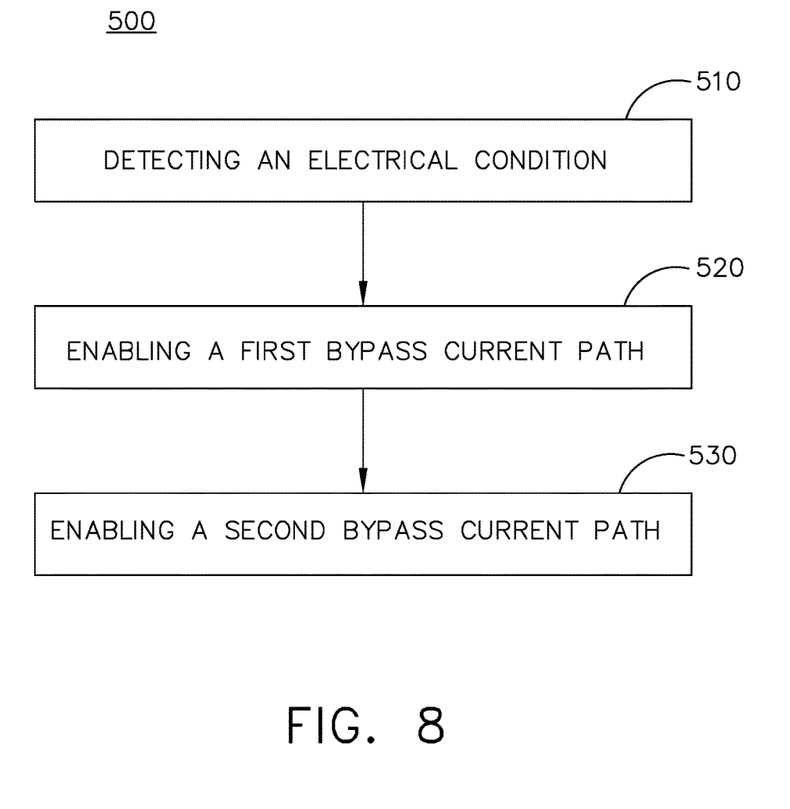
FIG. 8 is an example a flow chart diagram of demonstrating a method of operating a power system in accordance with various aspects described herein.

FIG. 8 illustrates a flow chart demonstrating a method 500 of operating a power distribution system 30, 130, 230, 330, 430. The method 500 begins by detecting an electrical condition in a power system component, the power system components including a set of power sources and a set of electrical loads in series, at 510. Next, the method 500 continues to enabling a first bypass current path in parallel with the power system component and disabling the power system component from the series, at 520. Simultaneously with the enabling of the first bypass current path, enabling a second bypass current path in parallel with another power system component and disabling the another power system component from the series, at 530. In the aforementioned method 500, the power system component and the another power system component are a pair of components comprising one power source and one electrical load.

Additional non-limiting method 500 steps can be included wherein, for example, detecting an electrical condition includes detecting an electrical fault in the power system component. Non-limiting aspects of the method 500 can further be included wherein at least one of the enabling the first bypass current path or the enabling the second bypass current path bypasses the faulted power system component. In yet another non-limiting aspect of the method 500, enabling the first bypass current path can include allocating power supplied by the set of power sources to a set of non-faulted electrical loads, as described herein. In yet another non-limiting aspect of the method 500, enabling the second bypass current path can include reducing power supplied by at least one power source over a period of time until no power is supplied, and then decoupling the at least one power source from the power system, as described herein.

The sequence depicted is for illustrative purposes only and is not meant to limit the method 500 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, further non-limiting aspects of the disclosure can be included, wherein a first power distribution system can be operably configured, arranged, controlled, or the like, to provide supplemental or redundant power outputs or power supplies to a second power distribution system. Additionally, non-limiting aspects of the disclosure can be included wherein any number of power generator systems can be included (e.g. three generator systems, four generator systems, five generator systems, etc.) in the power distribution system to provide supplemental or redundant power outputs or power supplies, as needed or desired. Additionally, the design and placement of the various components can be rearranged such that a number of different in-line configurations could be realized.

The aspects disclosed herein provide power distribution system having a set of bypass current paths. The technical effect is that the above described aspects enable the enabling or disabling, or the connecting and disconnecting of at least one power source and at least one electrical load. As load power on aircraft or power distribution systems increases, higher voltages can be utilized to power those loads. One advantage that can be realized in the above aspects is that the tailoring to the particularized power distribution needs can reduce the number of unnecessary or redundant power distribution components, while providing a comparably level of power distribution characteristics or redundancies. The higher voltage power systems, enabled by the series connecting of the power sources enable more power available for higher power consuming electrical loads, such as hybrid system that, for example, provide takeoff and climb assist for an aircraft, or direct energy systems.

Aspects of the disclosure can further allow for the high voltage power (e.g. 540 Volt DC power) while ensuring electrical faults are still adequately managed so to not allow for high current faults, minimizing or reducing arc to ground fault risks. By reducing and managing the fault currents, high current DC circuit breakers are not required, reducing costs and weight for the power system. Another advantage of the above described aspects is that the power distribution system allows for reconfiguration in flight or in process to enable or disable electrical loads not necessary at that particular instances, while providing redundancies in power supply to a set of electrical loads, such as flight critical or emergency loads.

When designing aircraft components, important factors to address are size, weight, and reliability. The above described power distribution system results in a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power system comprising:
 a first power source and a second power source arranged in a series to define a power source series;
 a first electrical load and a second electrical load arranged in series with to define a load series, the load series in series with the power source series; and
 a set of bypass current paths, each independently associated with one of at least a subset of: the first power source, the second power source, the first electrical load, and the second electrical load, and wherein the set of bypass current paths are configured to be selectably enabled to allow current to bypass a pair of components comprising at least one of the first power source and the second power source, and at least one of the first electrical load and the second electrical load.

2. The power system of claim 1 wherein the set of bypass current paths are arranged in parallel with a respective one of at least the subset of first power source, the second power source, the first electrical load, and the second electrical load.

3. The power system of claim 1 wherein the set of bypass current paths are independently associated with each of the first power source, the second power source, the first electrical load, and the second electrical load.

4. The power system of claim 1, further including a set of first switchable elements each respectively associated with one of the set of bypass current paths and in series with the respective first power source, the second power source, the first electrical load, or the second electrical load.

5. The power system of claim 4 wherein each of the set of bypass current paths include an in-line second switchable element, defining a set of second switchable element.

6. The power system of claim 5, further comprising a controller module configured to selectably operate the set of first switchable elements and the set of second switchable elements.

7. The power system of claim 6 wherein the controller module is configured to selectably enable at least a subset of the bypass current paths by disconnecting the associated first switchable element, and by connecting the respective bypass current path by way of the respective second switchable element.

8. The power system of claim 7 wherein the controller module is configured to selectably enable the bypass current paths of the pair of components.

9. The power system of claim 8 wherein the controller module is configured to selectably enable the bypass current paths of the pair of components upon at least one of fault or failure in at least one of the pair of components.

10. The power system of claim 1 wherein the first and second power sources are substantially alike.

11. The power system of claim 1 wherein at least one of the first or second power sources is a high voltage direct current power source.

12. The power system of claim 1 further comprising greater than two power sources, and greater than two electrical loads, wherein the number of power sources equals the number of electrical loads.

13. A method of operating a power system, comprising:
 detecting an electrical condition in a power system component, the power system components including a set of power sources arranged in series to define a power source series and a set of electrical loads in series to define a load series, the power source series in series with the load series;

enabling, by a controller module, a first bypass current path in parallel with the power system component and disabling the power system component from the power source series; and simultaneously enabling, by the controller module, a second bypass current path in parallel with another power system component and disabling the another power system component from the series;

wherein the power system component and the another power system component are a pair of components comprising one power source and one electrical load.

14. The method of claim 13 wherein the detecting an electrical condition includes detecting an electrical fault in the power system component.

15. The method of claim 14 wherein at least one of the enabling the first bypass current path or the enabling the second bypass current path bypasses the faulted power system component.

16. The method of claim 15 wherein enabling the first bypass current path includes allocating power supplied by the set of power sources to a set of non-faulted electrical loads.

17. The method of claim 16 wherein enabling the second bypass current path includes reducing power supplied by at least one power source over a period of time until no power is supplied, and then decoupling the at least one power source from the power system.

18. A power system comprising:
a set of direct current power sources arranged in a series defining a power source series;
a set of electrical loads arranged in series defining a load series, the load series in series with the power source series;
a set of bypass current paths independently associated with the set of the power sources and the electrical loads; and
a controller module configured to selectably enable at least a subset of bypass current paths to allow current to bypass a pair of components comprising at least one of the set of power sources and at least one of the set of electrical loads.

19. The power system of claim 18 wherein a number of enabled bypass current paths associated with the set of the power sources equals a number of enabled bypass current paths associated with the set of electrical loads.

20. The power system of claim 18 wherein the controller module is configured to selectably enable at least a subset of bypass current paths upon detection of an electrical fault.

* * * * *